United States Patent [19]

Rapata

[11] Patent Number: 5,207,750
[45] Date of Patent: May 4, 1993

[54] INSERT MOLDABLE RATCHET RIVET ASSEMBLY

[75] Inventor: George M. Rapata, Canton, Ohio

[73] Assignee: Illinois Tool Works Inc., Glenview, Ill.

[21] Appl. No.: 903,146

[22] Filed: Jun. 24, 1992

[51] Int. Cl.$^5$ .................. F16B 13/04; F16B 13/06
[52] U.S. Cl. .................................. 411/38; 411/43; 411/59; 411/908
[58] Field of Search .................... 411/34–38, 411/42, 43, 57, 59, 45, 908

[56] References Cited

U.S. PATENT DOCUMENTS

| | | | |
|---|---|---|---|
| 4,089,248 | 5/1978 | Anscher | 411/38 |
| 4,403,893 | 9/1983 | Wollar | 411/38 |
| 4,556,351 | 12/1985 | Wollar et al. | 411/57 X |
| 4,566,750 | 1/1986 | Umezu | 411/38 X |
| 4,639,175 | 1/1987 | Wollar | 411/43 X |
| 4,920,618 | 5/1990 | Iguchi | 411/38 X |

Primary Examiner—Neill R. Wilson
Attorney, Agent, or Firm—John P. O'Brian; Davis Chin

[57] ABSTRACT

An insertable moldable ratchet rivet assembly of a unitary construction for securing a plurality of panels together includes a drive-pin insert of a unique construction to facilitate the pull-up operation with a reduced amount of force and to form slots in the shank of a rivet housing. The drive-pin insert includes a body portion having a plurality of segments which are spaced apart from each other to form recessed flattened surfaces therebetween. Each of the flattened surfaces is provided with a plurality of lengthwise-spaced horizontal teeth. The rivet housing includes a head flange and a shank. The rivet shank is formed of a plurality of shank wall portions extending substantially from the rear surface of the rivet head flange. The plurality of shank wall portions are spaced apart from each other to provide slots therebetween which are formed by the plurality of segments on the body portion of the drive-pin insert.

15 Claims, 3 Drawing Sheets

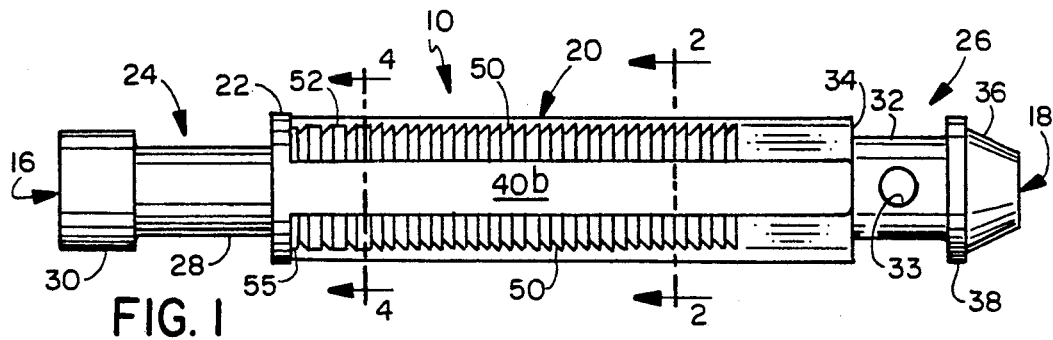
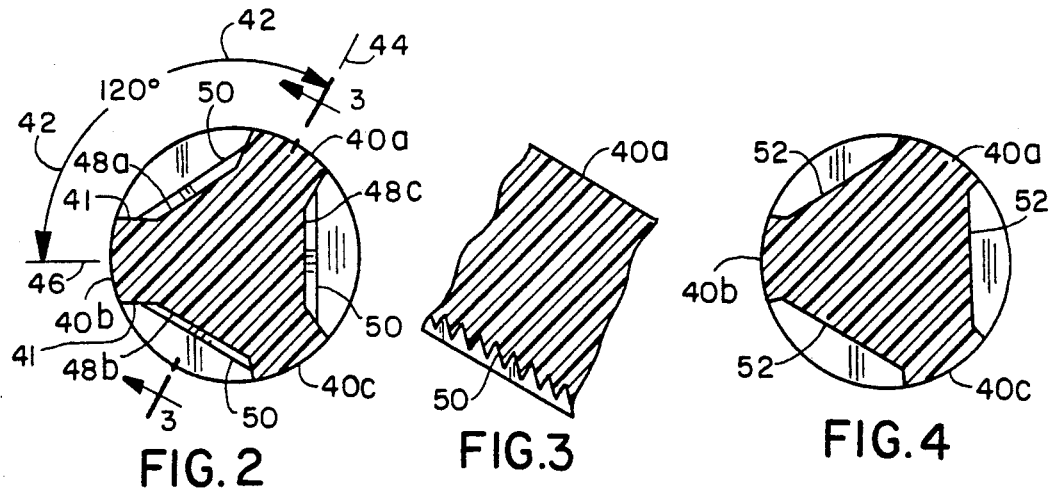
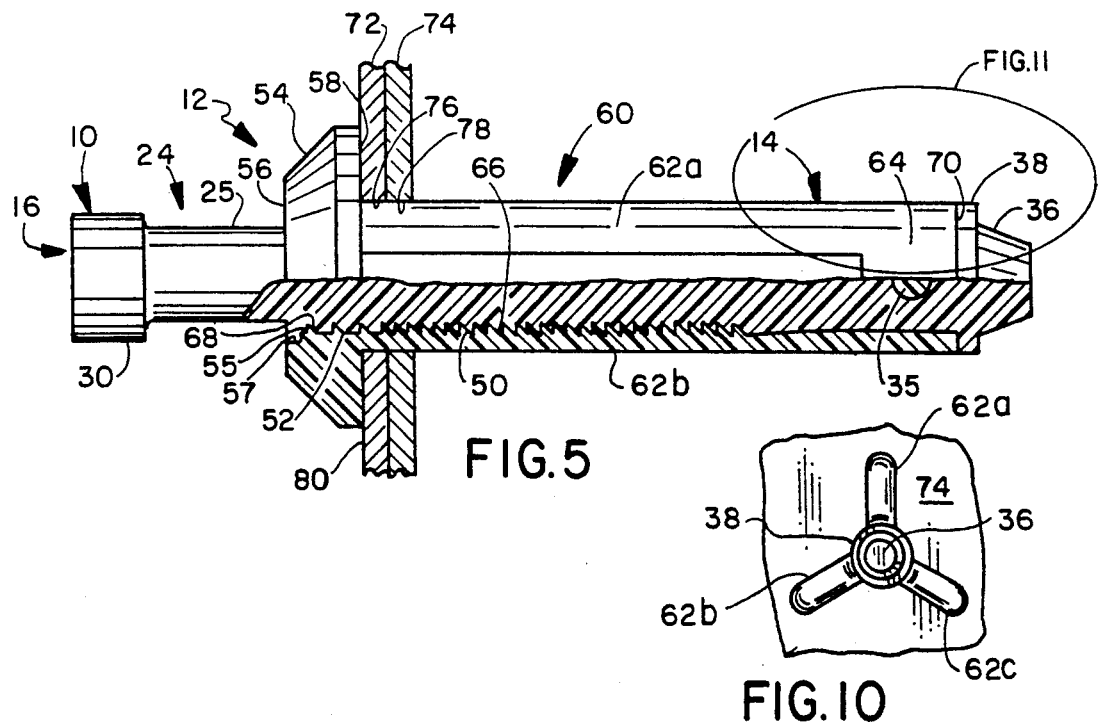

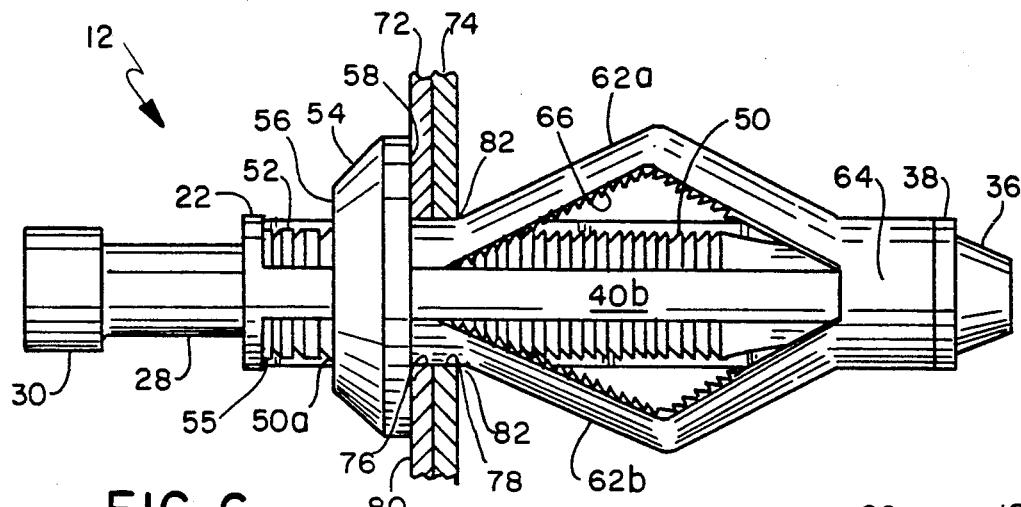
FIG. 6
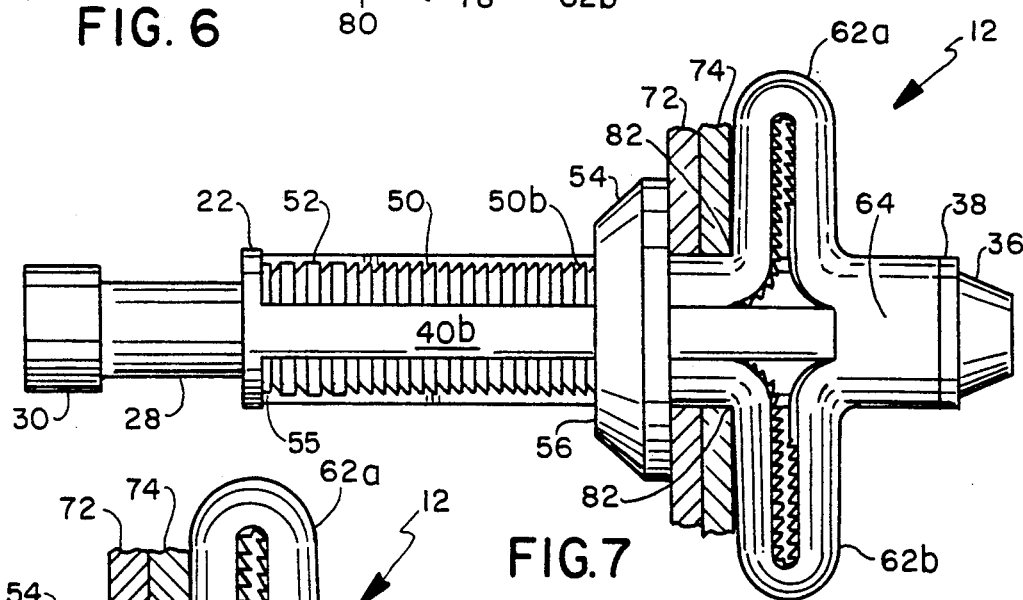
FIG. 7
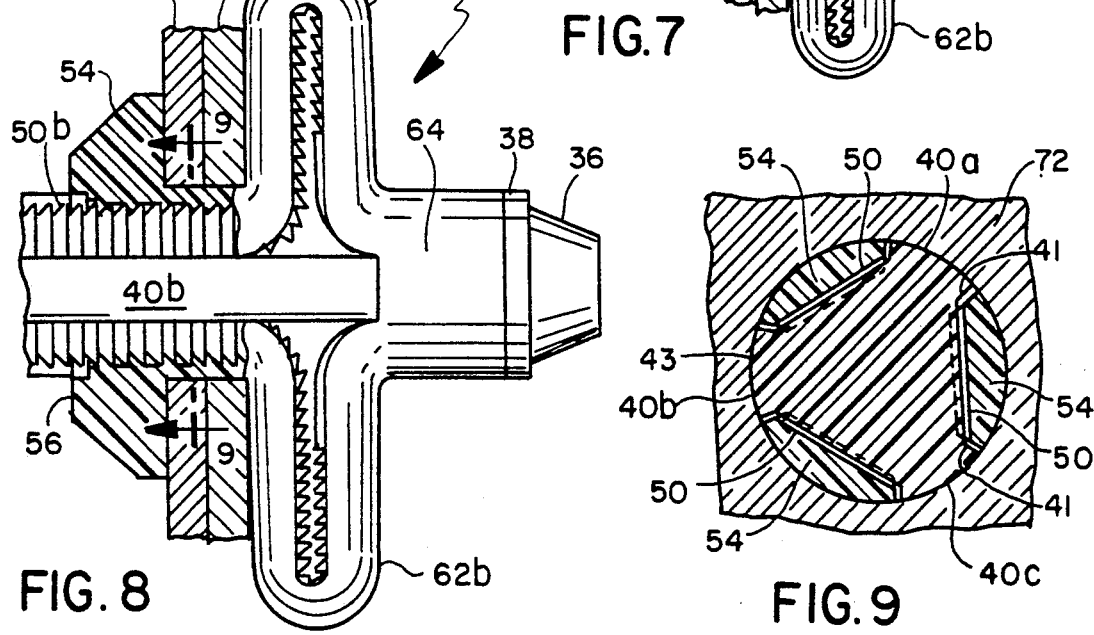
FIG. 8
FIG. 9

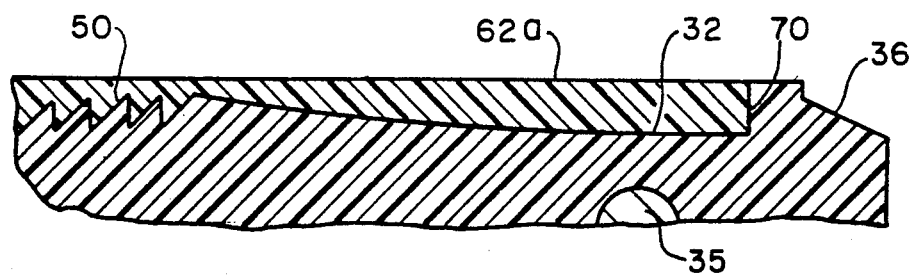
FIG. 11
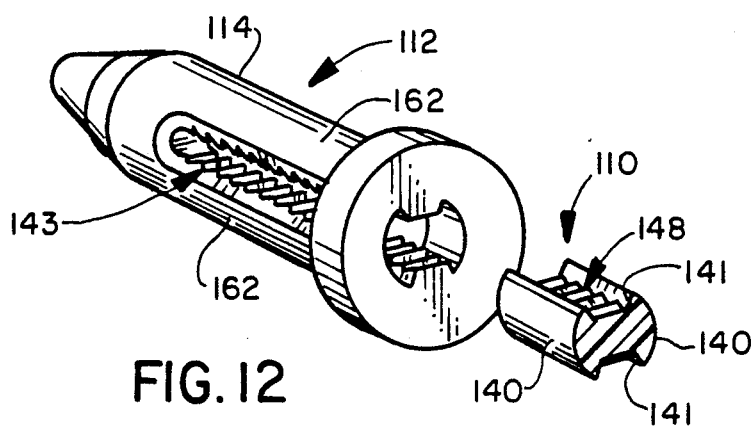
FIG. 12
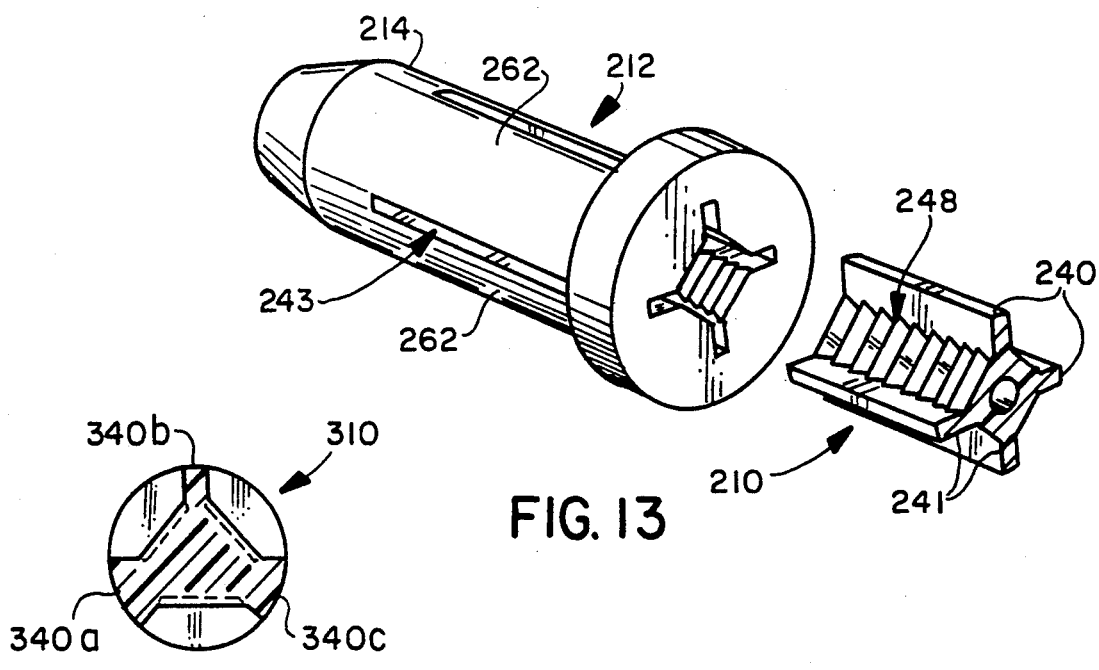
FIG. 13
FIG. 14

INSERT MOLDABLE RATCHET RIVET ASSEMBLY

BACKGROUND OF THE INVENTION

This invention relates generally to expandable fasteners and more particularly, it relates to an improved insert moldable ratchet rivet assembly for securing a plurality of panels together which includes a drive-pin insert of a unique construction to facilitate the pull-up operation with a reduced amount of force and to form slots in the shank of a rivet housing.

There are known heretofore in the prior art various types of such expandable fasteners. For example, U.S. Pat. No. 4,377,358 to Burnell J. Wollar issued on Mar. 22, 1983, discloses a one-piece plastic fastener 10 for lockable engagement in an opening in a panel which includes a stem 12 and a pair of arms 18 and 20 connected to and swingable about an inner end of the stem. A head portion is integrally formed at a free end of each of the arms, and these two head portions 32 and 34 are swingable with the arms to come together to define an apertured head 36 having an orifice 38 that embraces the stem 12. The stem and arm are driveable into the opening in the panel to locate the head against an outer side of the panel. The stem 12 is shiftable through the orifice 38 towards its inner end and causes the arms 18 and 20 to swing transversely and bear against the inside wall of the panel. Serrations 48 are provided between the head 36 and the stem 12 to maintain the fastener in lockable engagement with the panel.

In U.S. Pat. No. 4,403,893 to Burnell J. Wollar issued on Sep. 13, 1983, there is disclosed a one-piece plastic fastener 10 for lockable engagement in a workpiece opening which includes a stem 12 having an outer end 16 and an inner end 14 from which a pair of integrally formed arms 18 and 20 extend. The arms have two ends, one end forming an acute angle with the inner end 14 of the stem 12, and the other end terminating at an integrally formed head portion. The head portions 26 and 28 are swingable with their respective arms about the inner end 14 of the stem to cooperatively engage each other and to form a complete head 30 having an orifice 32 embracing the stem 12. The stem and arms are insertable into the opening 42 to locate the head against the outer side of the workpiece. Positive and outward withdrawal of the stem 12 through the opening and the orifice causes the arms to swing laterally and abut firmly against the inner side of the workpiece. Serrations 50 disposed between the head and the stem maintain the fastener in lockable engagement with the panel by readily permitting outward movement of the stem while resisting its inward movement.

Further, U.S. Pat. No. 4,556,351 to Burnell J. Wollar and Richard J. Schwind issued on Dec. 3, 1985, teaches an expansion rivet assembly 10 which is comprised of two separately molded plastic components, namely: (1) an expandable hollow plastic rivet or female member 20 and (2) a plastic drive-pin or male member 22. The rivet has a head 26 and a shank 24 which is insertable in aligned holes in workpieces to be joined. The drive-pin has a head 42 and a shank 40 which is inserted in the rivet bore 28 and adapted to be axially drawn into the bore by a tool which causes the pin head 42 to engage the insertion end of the rivet shank and effect outward expansion of the rivet shank wall 36. This axial movement also results in the breaking off of the projecting end 48 of the pin shank 40 at a break-away indentation 46 formed in the pin shank.

However, none of the prior art discussed above teach an insert moldable ratchet rivet assembly of a unitary construction for securing a plurality of panels together like that of the present invention which includes a drive-pin insert of a unique configuration to facilitate outward expansion of the rivet shank walls portions with a reduced pull-up force and to form slots in the shank of a rivet housing. The drive-pin insert includes a first end portion, second end portion, and a body portion extending between the first and second end portions. The body portion has a plurality of segments which are spaced apart from each other to form recessed flattened surfaces therebetween. Each of the flattened surfaces is provided with a plurality of lengthwise-spaced horizontal teeth which produces a line contact hinge with respect to corresponding lateral teeth formed in the shank wall portions of the rivet housing. As a result, the outward flexing of the rivet shank wall portions is thereby facilitated.

SUMMARY OF THE INVENTION

Accordingly, it is a general object of the present invention to provide an improved insert moldable ratchet rivet assembly which is relatively simple and economical to manufacture and use.

It is an object of the present invention to provide an improved insert moldable ratchet rivet assembly for securing a plurality of panels together which includes a drive-pin insert of a unique construction to facilitate a pull-up operation with a reduced amount of force and to form slots in the shank of a rivet housing.

It is another object of the present invention to provide an improved insert moldable ratchet rivet assembly which includes a drive-pin having a body portion formed with a plurality of segments that are spaced apart from each other to form recessed flattened surfaces therebetween, each of the flattened surfaces being provided with a plurality of lengthwise-spaced horizontal teeth for producing a line contact hinge with respect to corresponding lateral teeth formed in the shank wall portions of a rivet housing.

It is still another object of the present invention to provide an improved insert moldable ratchet rivet assembly which includes a drive-pin having a plurality of lengthwise-spaced horizontal teeth formed on recessed flattened surfaces and a rivet housing having a plurality of shank wall portions formed with lateral teeth which engagingly mate with the horizontal teeth of the drive-pin.

In accordance with these aims and objectives, the present invention is concerned with the provision of an improved insert moldable ratchet rivet assembly of a unitary construction for securing a plurality of panels together which includes a drive-pin insert and a rivet housing. The drive-pin insert has a first end portion, a second end portion, and a body portion extending between the first and second end portions. The body portion has a plurality of segments which are spaced apart from each other to form recessed flattened surfaces therebetween. Each of the flattened surfaces is provided with a plurality of lengthwise-spaced horizontal teeth. The first end portion is formed of a stem portion having its one end connected to the body portion and its other end connected to an annular flange. The second end portion is formed of a neck portion having its one end connected to the body portion and its other end connected to an end cap by an abutting flange.

The rivet housing has a head flange and a shank. The rivet housing is formed integrally with and surrounds the body portion and neck portion of the second end portion of the drive-pin insert. The rivet head flange has a front surface and a rear surface. The rivet shank is formed of a plurality of shank wall portions which extends from the rear surface of the rivet flange and are joined together at their other end by a continuous wall member. The plurality of shank wall portions are spaced apart from each other to provide slots therebetween formed by the plurality of segments. The plurality of shank wall portions are disposed over a corresponding one of the flattened surfaces to provide a plurality of lengthwise-spaced lateral teeth which engagingly mate with the horizontal teeth on the flattened surfaces.

The rivet shank is insertable through aligned openings in the plurality of panels so that the rear surface of the rivet head flange engages an outer surface of the plurality of panels. The first end portion of the drive-pin is moved positively relative to the rivet head flange and the aligned opening to thereby cause the abutting flange of the drive-pin insert to firmly engage the continuous wall member and to releasably disengage the drive-pin teeth from the lateral teeth so that the rivet shank wall portions flex outwardly to engage an inner surface of the plurality of panels.

BRIEF DESCRIPTION OF THE DRAWINGS

These and other objects and advantages of the present invention will become more fully apparent from the following detailed description when read in conjunction with the accompanying drawings with like reference numerals indicating corresponding parts throughout, wherein:

FIG. 1 is a plan view of one embodiment of a drive-pin insert for an insert moldable ratchet rivet assembly, constructed in accordance with the principles of the present invention;

FIG. 2 is a cross-sectional view, taken along the lines 2—2 of FIG. 1;

FIG. 3 is a cross-sectional view, taken along the lines 3—3 of FIG. 2;

FIG. 4 is a cross-sectional view, taken along the lines 4—4 of FIG. 1;

FIG. 5 is a side elevational view, partly in section, of a pull-up ratchet rivet assembly, illustrating its insertion through aligned openings in the panels to be joined together but prior to expansion of the rivet shank wall portions;

FIG. 6 is a view similar to FIG. 5, illustrating the rivet shank wall portions in a partially expanded condition to produce a relatively small clamping force upon the panels;

FIG. 7 is a view similar to FIG. 6, illustrating the rivet shank wall portions in a fully expanded condition to produce a relative large clamping force upon the panels;

FIG. 8 is a fragmentary view, partly in section, of the rivet assembly of FIG. 7, but on an enlarged scale;

FIG. 9 is a cross-sectional view, taken along the lines 9—9 of FIG. 8;

FIG. 10 is a right end view of the rivet assembly of FIG. 7, illustrating the three rivet shank wall portions or prongs in an expanded condition;

FIG. 11 is an enlarged view of the encircled area of FIG. 5, illustrating the nose portion of the rivet shank joined to the neck portion of the drive-pin by a cross pin;

FIG. 12 is an exploded, perspective view of a second embodiment of an insert moldable ratchet rivet assembly, illustrating a rivet housing having two prongs with slots therebetween formed by the two segments of the drive-pin;

FIG. 13 is an exploded, perspective view of a third embodiment of an insert moldable ratchet rivet assembly, illustrating a rivet housing having four split prongs with a multiplicity of slots formed by the four thin blades of the drive-pin; and FIG. 14 is a view similar to FIG. 2, illustrating an alternate embodiment of the drive-pin in which the segments are unevenly spaced apart from each other.

DESCRIPTION OF THE PREFERRED EMBODIMENTS

Referring now in detail to the drawings, there is shown in FIG. 1 one embodiment of a drive-pin insert 10 used in an insert moldable ratchet rivet assembly 12 (FIG. 5) and constructed in accordance with the principles of the present invention. The drive-pin 10 insert of a unique configuration is illustrated in FIGS. 1 through 4 as it appears after being formed by a conventional injection molding process utilizing a simple two-plate mold. The drive-pin 10 of FIG. 1 is then inserted into another mold, and an overmolded body or rivet housing 14 is fabricated around the drive-pin to form the rivet assembly 12 of a unitary construction. The drive-pin 10 and the rivet housing 14 may be constructed of several thermoplastic or thermoset materials, as for example, polyethylene, nylon, phenolic, or the like.

As can be seen from FIG. 1-4, the drive-pin 10 has a first end 16 and a second end 18. The drive-pin 10 is comprised of a substantially triangular-shaped body portion 20 having an annular flange 22 near the first end, a left end portion 24, and a right end portion 26. The left end portion 24 includes a stem portion 28 having its one end connected to the annular flange 22 and its other end connected to a circular head flange 30. The right end portion 26 includes a neck portion 32 having an aperture 33 which joins the rear end 34 of the body portion 20 to an end cap 36 via a circular abutting flange 38.

The body portion 20 is formed by a plurality of (three) arcuate segments 40a, 40b, and 40c which are spaced equally apart from each other. It can be seen that the intermediate point of the segment 40b lies approximately 120° from the intermediate point of the segment 40a, as indicated by the arcuate arrows 42 between lines 44 and 46. Similarly, the intermediate point of the arcuate segment 40c lies approximately 120° from each of the lines 44 and 46. Disposed between the segments 40a and 40b, there is a recessed flattened surface 48a. Also, a recessed flattened surface 48b is disposed between the arcuate segments 40b and 40c, and a recessed flattened surface 48c is disposed between the segments 40c and 40a. It will be noted that each of the arcuate segments 40a, 40b, and 40c are defined between corresponding side edges 41 (FIGS. 2 and 9) which are used to form respective slots 43 in the shank of the rivet housing 14.

Each of the flattened surfaces 48a, 48b and 48c on the body portion 20 is provided with a plurality of lengthwise-spaced horizontal ratchet teeth 50. The ratchet teeth are constructed so as to permit movement of the drive-pin 10 to the left with respect to FIG. 5 but resist movement of the drive-pin to the right. Further, each of the flattened surfaces are provided with a plurality of double-spaced horizontal ratchet teeth 52 adjacent the annular flange 22 which are wider than the teeth 50.

Referring now to FIG. 5, the rivet housing 14 is comprised of a head flange 54 having a front surface 56 and a rear surface 58, and a cylindrical-shaped shank 60 extending outwardly from the rear surface 58. The shank 60 includes a plurality of (three) rivet shank portions 62a, 62b, and 62c which are equally spaced apart from each other at a predetermined distance so as to provide the slots 43 (FIG. 9) therebetween formed by the arcuate segments 40a, 40b and 40c. The wall portions are of an arcuate shape, each having its one end joined to the rear surface 58. The other end of the wall portions are integrally joined together by a circular or continuous wall member 64. It will be noted that the head flange 54 may be provided with a shoulder or collar 57 for supporting the left-most tooth 52 so as to prevent its severe deformation.

The rivet housing 14 is molded over the drive-pin insert 10 so that the wall portions 62a–62c conform to the contours of the respective flattened surfaces 48a–48c (FIG. 2) with the teeth 50, and the head flange 54 abuts the contour of the annular flange 22 (FIG. 1) and the double-spaced teeth 52. As a result, the interior of the wall portions 62a–62c are formed with a plurality of lengthwise-spaced horizontal or lateral teeth 66 which engagingly mate with the horizontal teeth 50 therebetween. Further, the head flange 54 is formed with internal spaced teeth 68 which engagingly mate with the wider horizontal teeth 52 therebetween.

It will be noted that the left end portion 24 of the drive-pin 10 extends outwardly from the head flange 54 of the rivet assembly 14, that is, to the left with respect to FIG. 5. The neck portion 32 (FIG. 1) of the right end portion 26 is of a smaller diameter than the inner diameter of the continuous wall member 64 and is surrounded by the same. The diameter of the abutting flange 38 is substantially equal to the inner diameter of the circular wall member 64. The flange 38 is in abutting relationship to the outer surface 70 of the continuous wall member 64. The end cap 36 extends outwardly from the flange 38, that is, to the right relative to FIG. 5 to provide a lead-in for assembly. Further, it can best be seen in FIG. 11 that the neck portion is slightly tapered upwardly from the abutting flange 32 to the horizontal teeth 50 adjacent the right end portion 26 as shown in FIG. 1. This tapered neck portion serves to prevent breaking of the respective ends of the shank wall portions which are integrally joined to the circular wall member or nose portion 64.

As can be seen, the opening 33 shown in FIG. 11 in the neck portion 32 is filled with plastic defining a cross pin 35 which insures a locking interengagement so as to anchor the right end portion 26 of the drive-pin 10 with the nose portion 64 of the rivet housing 14 (FIG. 5), thereby preventing the rivet housing 14 from moving past the abutting flange 38. In this manner, the rivet assembly 12 of FIG. 5 is thus formed by the overmolding of the plastic material to form the rivet housing 14 surrounding the drive-pin 10 which is positioned in a second two-plate mold or axially inserted into an end cavity.

The rivet assembly 12 may be used for securing two panels 72 and 74 together. Initially, the rivet shank 14 of the rivet assembly is inserted through the aligned holes 76 and 78 in the two panels 72, 74, as shown in FIG. 5. The rear surface 58 of the head flange 54 bears against the outer surface 80 of the panel 72. The left end 16 of the drive-pin 10 extends outwardly from the head flange 54 and defines an undercut tool-engageable portion which is ready to be gripped by a conventional fastener tool to effect rivet expansion. Such a tool (not shown) generally consists of two relatively movable components, one of which forces the head flange 54 firmly against the outer surface 80 of the panel 72 and the other one of which simultaneously grips the end head flange 30 of the left end portion 24 and pulls it axially (to the left relative to FIG. 5). Alternatively, a tool can frictionally clamp a relatively smooth cylindrical drive-pin extension.

The operation of the rivet assembly 12 will be explained with reference to FIGS. 6 through 10. As the shank portion 20 of the drive-pin 10 designated in FIG. 1 is being positively withdrawn or pulled outwardly or axially through the head flange 54 and the aligned openings 76 and 78 in the panels, the double-spaced horizontal teeth 52 will be releasably disengaged from the internal teeth 68 in the head flange. Such axial movement of the pin head flange 30 causes the abutting flange 38 to move against the outer surface 70 of the nose portion 64. Due to the double-spaced teeth 52, the drive-pin 10 can be pulled outwardly with a reduced initial pull-up force, thereby facilitating installation.

Unlike the annular ratchet teeth formed on a circular drive-pin of the prior art, the horizontal teeth 50 are formed on the (three) flattened surfaces 48a–48c so as to produce a "line contact" hinge with respect to the lateral surfaces or teeth 66, thereby producing a greater force and thus facilitating the expansion of the rivet shank wall portions. As a result, the plurality of (three) shank wall portions 62a–62c are folded outwardly to the position shown in FIG. 6, 7, 8 and 10 in which the two panels 72 and 74 are sandwiched together between the rear surface 58 of the head flange 54 and the folded wall portions 62a–62c.

In particular, as the drive-pin 10 moves axially from the position shown in FIG. 5 to the position shown in FIG. 6, the horizontal teeth 50 will be releasably disengaged from the lateral surfaces or teeth 66 so as to cause the wall portions 62a–62c to bend at shoulder portions 82. Further, it can be seen from FIG. 9 that the horizontal teeth push outwardly against and bite into the interior adjacent the head flange 54, thereby maintaining a tighter lockable engagement with the panels 72 and 74 by applying outward pressure at the openings 76 and 78 in FIG. 5.

Any particular ones of the horizontal teeth 50 on the respective flattened surfaces 48a–48c may be chosen to selectively engage with the vertical surface 55 of the head flange 54 so as to obtain the desired clamping pressure upon the two panels. The horizontal teeth 50a in FIG. 6 are relatively close to the left end portion 24 of the drive-pin and engage the vertical surface 55 of tooth in the head flange so as to exert a relatively small clamping pressure on the two panels. On the other hand, the horizontal teeth 50b in FIGS. 7 and 8 are relatively close to the right end portion 26 of the drive-pin 10 and engage the vertical surface 55 of the tooth in the head flange so as to exert a relatively larger clamping pressure on the two panels. After the desired ones of the teeth 50 engage the vertical surface 55, the fastener tool shears the shank portion 20 of the drive-pin that protrudes outwardly from the head flange 54 so that the outermost end of the remaing shank portion 20 is substantially flush with the head flange.

Further, it should be appreciated by those skilled in the art that the body portion 20 of the drive-pin may be substantially rectangular in cross-section rather than the triangular-shape as illustrated. In particular, the plurality of lengthwise-spaced horizontal teeth 50 may be provided on two flattened opposed surfaces with flat segments connected therebetween. As a result, there would be only two corresponding shank wall portions forming the rivet shank 14.

In addition, it should be understood that the rivet shank 60 illustrated as being cylindrical could be formed with a rectangular, square, "D" shape, or any other irregular shape so as to fit complementary holes disposed in the panels. Likewise, the nose portion 64 may be eliminated so as to allow the shank wall portions to expand outwardly. Further, the drive-pin may be suitably modified so as to provide a push-in type of ratchet rivet assembly rather than the pull-up type of ratchet rivet assembly depicted in FIG. 5.

In FIG. 12, there is shown a second embodiment of a ratchet rivet assembly 12 which includes a rivet housing 114 having two shank wall portions or prongs 162 with slots 143 formed therebetween. The drive-pin 110 includes two segments 140 which are spaced apart from each other forming two flattened opposed surfaces 148 therebetween. The segments 140 are defined by side edges 141 which are used to form the corresponding slots 143 between the prongs 162 of the rivet housing 114.

In FIG. 14, there is shown a third embodiment of a ratchet rivet assembly 212 which includes a rivet housing 214 having four shank wall portions or split prongs 262 with a multiplicity of slots 243 formed therebetween. The drive-pin 210 includes four thin blades 240 which are spaced apart from each other forming four flattened surfaces 248 therebetween. The thin blades 240 are defined by side edges 241 which are used to form the corresponding slots 243 between the split prongs 262 of the rivet housing 214.

In FIG. 14, there is shown an alternate embodiment of a drive-pin 310 whose body portion is formed by a plurality of segments 340a, 340b, and 340c which are unevenly spaced from each other. It can be seen that the segments 340a and 340c are substantially of the same size but the segment 340b is made smaller than the segments 340a and 340c. As a result, the corresponding slots formed in the rivet housing will be of varying sizes as well.

From the foregoing detailed description, it can thus be seen that the present invention provides an improved pull-up ratchet rivet assembly for securing a plurality of panels together which includes a drive-pin insert of a unique construction to facilitate the pull-up operation with a reduced amount of force and to form slots in the shank of a rivet housing. The drive-pin insert has a first end portion, second end portion, a body portion extending between the first and second end portions. The body portion includes a plurality of segments which are spaced apart from each other to form recessed flattened surfaces therebetween. Each of the flattened surfaces are provided with a plurality of lengthwise-spaced horizontal teeth to provide a line contact hinge with respect to corresponding lateral teeth formed in a rivet housing shank. As a result, the outward flexing of the rivet shank wall portions of the rivet housing is greatly facilitated.

While there has been illustrated and described what are at present considered to be preferred embodiments of the present invention, it will be understood by those skilled in the art that various changes and modifications may be made, and equivalents may be substituted for elements thereof without departing from the true scope of the invention. In addition, many modifications may be made to adapt a particular situation or material to the teachings of the invention without departing from the central scope thereof. Therefore, it is intended that this invention not be limited to the particular embodiments disclosed as the best modes contemplated for carrying out the invention, but that the invention will include all embodiments falling within the scope of the appended claims.

What is claimed is:

1. An insert moldable ratchet rivet assembly of a unitary construction for securing a plurality of panels together, said rivet assembly comprising:

a drive-pin having a first end portion, a second end portion, and a substantially triangular shaped body portion extending between said first and second end portion;

said body portion having a plurality of arcuate segments which are spaced equally apart from each other to form recessed flattened surfaces therebetween;

each of said flattened surfaces being provided with a plurality of lengthwise-spaced horizontal teeth;

said first end portion being formed of a stem portion having its one end connected to said body portion and its other end connected to an annular flange;

said second end portion formed of a neck portion having its one end connected to said body portion and its other end connected to an end cap by an abutting flange;

a rivet housing having a head flange and a cylindrical-shaped shank, said rivet housing being formed integrally with and surrounding said shank portion and said neck portion of said second end portion of said drive-pin;

said rivet head flange having a front surface and a rear surface;

said rivet shank being formed of a plurality of shank wall portions extending from the rear surface of said rivet head flange and being joined together at their other end by a circular wall member;

said plurality of shank wall portions being spaced equally apart from each other to provide slots therebetween which are formed by said plurality of arcuate segments on said body portion of said drive-pin, said plurality of shank wall portions being disposed over a corresponding one of said flattened surfaces to provide a plurality of lengthwise-spaced lateral teeth which engagingly mate with said horizontal teeth on said flattened surfaces;

said rivet shank being insertable through aligned openings in said plurality of panels so that the rear surface of said rivet head flange engages an outer surface of said plurality of panels;

said first end portion of said drive-pin being moved positively relative to said rivet head flange and said aligned openings to thereby cause said abutting flange of said drive-pin to firmly engage with said circular wall member an to releasably disengage said horizontal teeth on said flattened surfaces from said lateral teeth so that said rivet shank wall portions flex outwardly to engage an inner surface of said plurality of panels; and a plurality of double-spaced horizontal teeth disposed inside said annular flange which are wider than said plurality of lengthwise-spaced horizontal teeth so as to permit the drive-pin to be removed axially with a reduced initial force, thereby facilitating installation.

2. An insert moldable ratchet rivet assembly as claimed in claim 1, wherein said horizontal teeth on said flattened surfaces provide a line contact hinge with respect to said corresponding lateral teeth, thereby facilitating the outward flexing of said rivet shank wall portions.

3. An insert moldable ratchet rivet assembly as claimed in claim 1, wherein said neck portion is tapered from the abutting flange to the horizontal teeth adjacent said second end portion.

4. An insert moldable ratchet rivet assembly as claimed in claim 3, wherein said neck portion includes an opening for receiving a cross pin to anchor said drive-pin to said rivet housing.

5. An insert moldable ratchet rivet assembly as claimed in claim 4, wherein said rivet housing is made of a plastic material which is formed over said drive-pin to provide said rivet assembly of the unitary construction.

6. An insert moldable ratchet rivet assembly of a unitary construction for securing a plurality of panels together, said rivet assembly comprising:
  a drive-pin including a body portion having a triangular shape;
  said body portion having a plurality of segments which are spaced apart from each other to form flattened surfaces therebetween;
  each of said flattened surfaces being provided with a plurality of lengthwise-spaced horizontal teeth;
  a rivet housing having a head flange and a shank, said rivet housing being formed integrally with and surrounding said body portion of said drive-pin;
  said rivet head flange having a front surface and a rear surface;
  said rivet shank being formed of a plurality of split wall portions extending substantially from the rear surface of said rivet head flange and being joined together at their other end by a continuous wall member;
  said plurality of split wall portions being spaced apart from each other to provide slots therebetween which are formed by said plurality of segments on said body portion of said drive-pin, said plurality of split wall portions being disposed over a corresponding one of said flattened surfaces to provide a plurality of lengthwise-spaced lateral teeth which engagingly mate with said horizontal teeth on said flattened surfaces;
  said rivet shank being insertable through aligned openings in said plurality of panels so the rear surface of said rivet head flange engages an outer surface of said plurality of panels; and
  said drive-pin being moved positively relative to said rivet head flange and said aligned openings to releasably disengage said horizontal teeth on said flattened surfaces from said lateral teeth so that said rivet split wall portions flex outwardly to engage an inner surface of said plurality of panels.

7. An insert moldable ratchet rivet assembly as claimed in claim 6, wherein said plurality of segments is comprised of three segments.

8. An insert moldable ratchet rivet assembly as claimed in claim 6, wherein said horizontal teeth on said flattened surfaces provide a line contact hinge with respect to said corresponding lateral teeth, thereby facilitating the outward flexing of said rivet split wall portions.

9. An insert moldable ratchet rivet assembly as claimed in claim 6, further comprising a plurality of double-spaced horizontal teeth inside said annular flange which are wider than said horizontal teeth so as to permit the drive-pin to be moved axially with a reduced initial force, thereby facilitating installation.

10. An insert moldable ratchet rivet assembly as claimed in claim 6, wherein said neck portion is tapered from the abutting flange to the horizontal teeth adjacent said second end portion.

11. An insert moldable ratchet rivet assembly as claimed in claim 10, wherein said neck portion includes an opening for receiving a cross pin to anchor said drive-pin to said rivet housing.

12. An insert moldable ratchet rivet assembly as claimed in claim 11, wherein said rivet housing is made of a plastic material which is formed over said drive-pin to provide said rivet assembly of the unitary construction.

13. An insert moldable ratchet rivet assembly of a unitary construction for securing a plurality of panels together, said rivet assembly comprising:
  a drive-pin insert having a body portion;
  said body portion having a plurality of segments which are spaced apart from each other to form recessed flattened surfaces therebetween;
  each of said flattened surfaces being provided with a plurality of lengthwise-spaced horizontal teeth;
  a rivet housing having a head flange and a shank, said rivet housing being formed integrally with and surrounding said body portion of said drive-pin insert;
  said rivet head flange having a front surface and a rear surface;
  said rivet shank being formed of a plurality of split wall portions extending substantially from the rear surface of said rivet head flange;
  said plurality of shank wall portions being spaced equally apart from each other to provide slots therebetween which are formed by said plurality of segments on said body portion of said drive-pin insert, said plurality of shank wall portions being disposed over a corresponding one of said flattened surfaces to provide a plurality of lengthwise-spaced lateral teeth which engagingly mate with said horizontal teeth on said flattened surfaces;
  said rivet shank being insertable through aligned openings in said plurality of panels so that the rear surface of said rivet head flange engages an outer surface of said plurality of panels;
  said drive-pin insert being moved positively relative to said rivet head flange and said aligned openings to releasably disengage said horizontal teeth on said flattened surfaces from said lateral teeth so that said rivet shank wall portions flex outwardly to engage an inner surface of said plurality of panels; and
  a plurality of double-spaced horizontal teeth disposed inside said annular flange which are wider than said plurality of lengthwise-spaced horizontal teeth so as to permit the drive-pin insert to be moved axially with a reduced initial force, thereby facilitating installation.

14. An insert moldable ratchet rivet assembly as claimed in claim 13, wherein said horizontal teeth on said flattened surfaces provide a line contact hinge with respect to said corresponding lateral teeth, thereby facilitating the outward flexing of said rivet shank wall portions.

15. An insert moldable ratchet rivet assembly as claimed in claim 13, wherein said rivet housing is made of a plastic material which is formed over said drive-pin insert to provide said rivet assembly of the unitary construction.

* * * * *